United States Patent
Shimomura et al.

(10) Patent No.: US 6,930,807 B1
(45) Date of Patent: Aug. 16, 2005

(54) COLOR IMAGE READING APPARATUS

(75) Inventors: Hidekazu Shimomura, Kawasaki (JP); Yukio Takemura, Kawasaki (JP); Takeshi Yamawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,020

(22) Filed: Jan. 29, 1999

(30) Foreign Application Priority Data

Feb. 2, 1998 (JP) .......................................... 10-035505
May 27, 1998 (JP) .......................................... 10-162974

(51) Int. Cl.⁷ .............................................. H04N 2/04
(52) U.S. Cl. ...................... 358/505; 358/512; 358/513; 358/514; 382/168; 382/167
(58) Field of Search ................ 358/505, 512, 358/513, 514, 515, 518; 382/168, 167

(56) References Cited

U.S. PATENT DOCUMENTS

| | | | | |
|---|---|---|---|---|
| 4,993,792 A | * | 2/1991 | Minoura | 359/206 |
| 5,250,980 A | * | 10/1993 | Yakubo et al. | 355/32 |
| 5,481,381 A | * | 1/1996 | Fujimoto | 358/505 |
| 5,815,301 A | * | 9/1998 | Naiki et al. | 359/205 |
| 6,118,570 A | * | 9/2000 | Kanai et al. | 359/210 |
| 6,373,870 B1 | * | 4/2002 | Yamazaki et al. | 372/25 |
| 6,445,483 B2 | * | 9/2002 | Takada et al. | 359/207 |

* cited by examiner

Primary Examiner—Kimberly Williams
Assistant Examiner—Negussie Worku
(74) Attorney, Agent, or Firm—Fitzpatrick, Cella, Harper & Scinto

(57) ABSTRACT

A color image reading apparatus has a 3-line sensor formed by setting a plurality of line sensors on a single substrate, an imaging lens for imaging an object, a diffraction grating which is inserted in the optical path between the imaging lens and 3-line sensor and color-separates a light beam coming from the object into a plurality of color light beams, and a first cylinder unit which is inserted in the optical path between the object and the imaging lens, and temporarily images the object in the sub-scanning direction in the optical path before the imaging lens.

18 Claims, 7 Drawing Sheets

COLOR IMAGE READING APPARATUS

BACKGROUND OF THE INVENTION

1. Field of the Invention

The present invention relates to a color image reading apparatus and, more particularly, to a color image reading apparatus, which can accurately read color image information on the original surface using a simple, monolithic 3-line sensor, and is suitable for, e.g., a color scanner, color facsimile apparatus, and the like, since it can relax required mechanical precision by broadening the allowable range of synchronization errors caused due to the attachment precision of a scanning mirror, parallelness between the original surface and a guide rail that guides a scanning mirror unit, and the like, and corrects any asymmetry among the spacings of a plurality of color light beams, which are color-separated in the sub-scanning direction, on the surface of a light-receiving means.

2. Related Background Art

Conventionally, various color image reading apparatuses have been proposed. In such color image reading apparatus, color image information of, e.g., an original or the like is scanned in units of lines in the sub-scanning direction, and is imaged on the surface of a monolithic 3-line sensor (to be simply referred to as a "3-line sensor" hereinafter) serving as an image reading means (light-receiving means) via an imaging optical system, thus reading the color image information of, e.g., the original or the like using an output signal obtained from the 3-line sensor.

Figure 1:
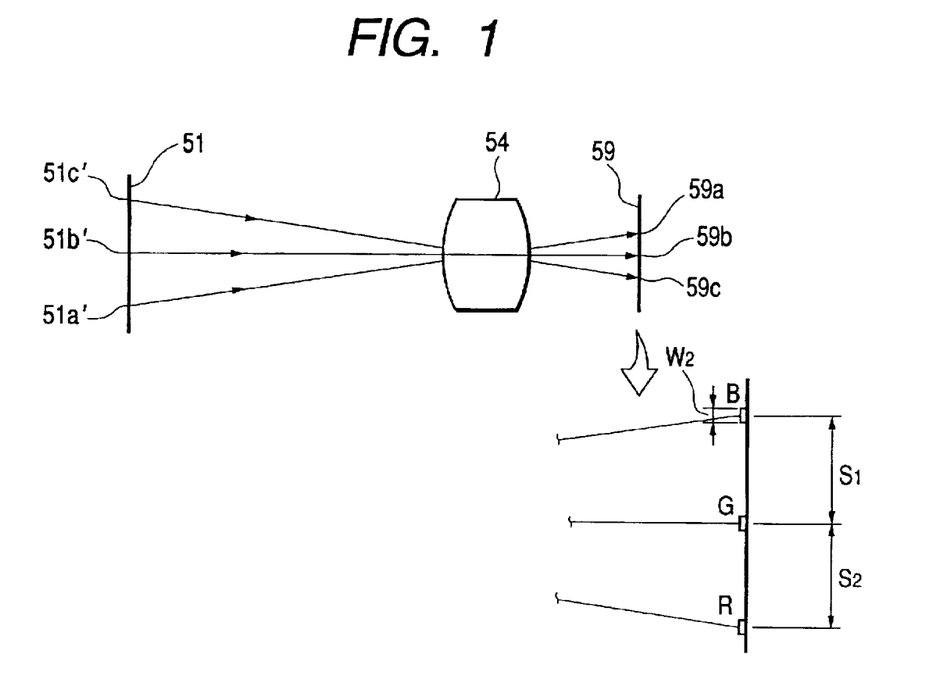
FIG. 1 is a schematic view showing principal part of the optical system of a conventional color image reading apparatus.

FIG. 1 is a schematic view showing principal part of a conventional color image reading apparatus of this type. Referring to FIG. 1, a light beam reflected by a color image on an original surface 51 illuminated with an illumination means (not shown) is imaged on a surface of a 3-line sensor 59 via an imaging optical system 54, thus reading color image information of, e.g., the original or the like using an output signal obtained from the 3-line sensor 59.

As shown in FIG. 1, when a color image is read by the 3-line sensor 59 using the normal imaging optical system 54 alone, the reading positions on the original surface 51 that can be simultaneously read by three line sensors 59a, 59b, and 59c become three different positions 51a', 51b', and 51c'.

For this reason, three color signal components (R, G, and B) of an arbitrary position on the original surface 51 cannot be simultaneously read, and after these components of the arbitrary position are separately read by the 3-line sensor 59, they must be registered and synthesized.

Figure 2:
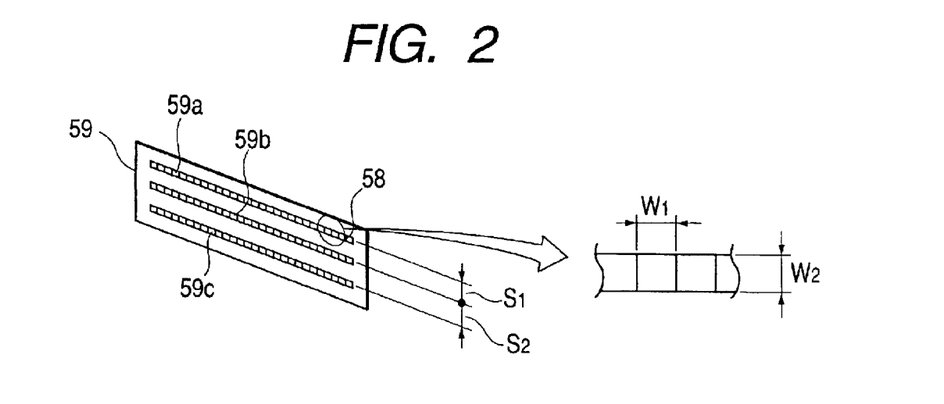
FIG. 2 is an explanatory view of a monolithic 3-line sensor.

For this purpose, spacings $S_1$, and $S_2$ between adjacent lines of the 3-line sensor 59 are set to be an integer multiple of a pixel size W2 of each pixel 58, as shown in FIG. 2, and corresponding redundant line memories are prepared. Then, G and R signals (signal components based on G and R color light beams) are delayed with respect to a B signal (a signal component based on a B color light beam), thus relatively easily obtaining synthesized three-color signal components.

However, upon assigning redundant line memories in correspondence with the inter-line distances of the 3-line sensor 59 in the above-mentioned color image reading apparatus, a plurality of lines of expensive line memories must be prepared, resulting in disadvantages in terms of cost, and posing problems, e.g., a complicated arrangement of the overall apparatus and the like. Note that FIG. 2 is an explanatory view of the 3-line sensor 59 shown in FIG. 1.

Figure 3:
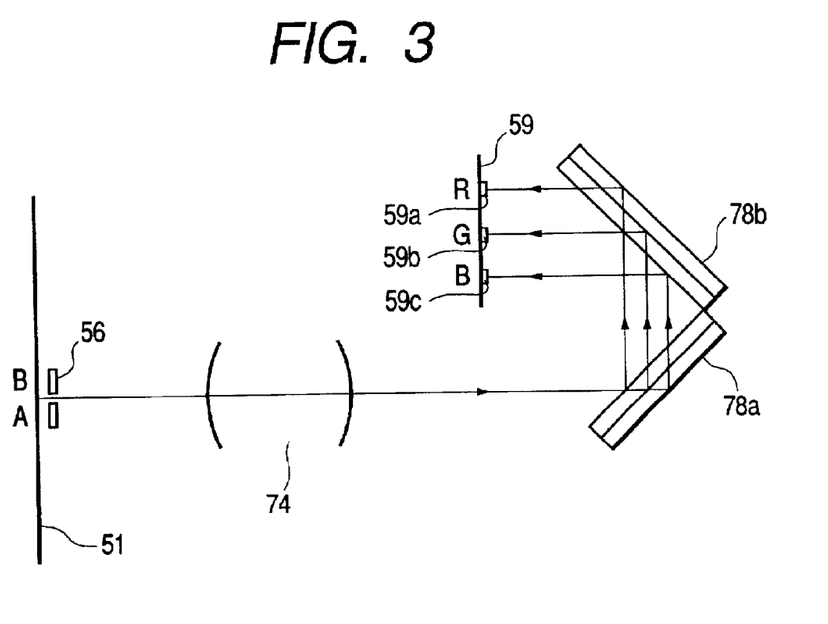
FIG. 3 is a schematic view showing principal part of the optical system of a conventional color image reading apparatus.

FIG. 3 is a schematic view showing principal part of a conventional image reading apparatus which color-separates color image information of an original using a beam splitter for color separation into three, i.e., R, G, and B color image signals, and simultaneously reads the three, i.e., R, G, and B color image signals.

Referring to FIG. 3, when a light beam reflected by a color image on the original surface 51 illuminated with an illumination means (not shown) is imaged on the surface of the 3-line sensor 59 by an imaging lens 74, the light beam is color-separated into three light beams (color light beams) corresponding to, e.g., three, i.e., R, G, and B colors, via two beam splitters 78a and 78b for color separation. Then, color images based on the three color light beams are imaged on the surfaces of the line sensors 59a, 59b, and 59c of the 3-line sensor 59. In this way, the color image is scanned in units of lines to read that image in units of color light components.

However, the beam splitters 78a and 78b for color separation in FIG. 3 require a very thin glass plate since three layers of dichroic mirrors are placed parallel to each other, and such structure is very difficult to manufacture.

Figure 4:
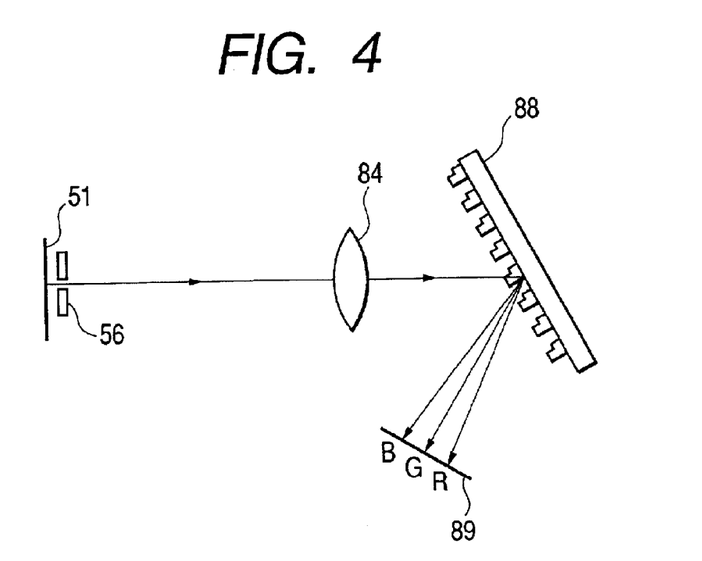
FIG. 4 is a schematic view showing principal part of the optical system of a conventional color image reading apparatus.

FIG. 4 is a schematic view (sub-scanning sectional view) showing principal part of a conventional reading apparatus in the sub-scanning direction, which color-separates color image information on an original into three, i.e., R, G, and B color image signals using a reflection linear blazed diffraction grating, and simultaneously reads three, i.e., R, G, and B image signals using a 3-line sensor.

Referring to FIG. 4, a 3-line sensor 89 is used as an image reading means, and a reflection linear blazed diffraction grating 88 serving as a color-separation means is placed in the imaging optical path to be separated from the exit pupil of an imaging lens 84 in the direction of the 3-line sensor 89, so as to attain color separation using reflection and diffraction. Color image information for one line on the original surface 51 is color-separated and imaged on the surface of the 3-line sensor 89, thus reading the color image information.

The reflection linear blazed diffraction grating as the color-separation means in FIG. 4 can be easily manufactured but suffers the following problems. More specifically, in FIG. 4, in order to color-separate a light beam into three, i.e., R, G, and B color light beams (diffracted light beams) using the linear blazed diffraction grating, e.g., to obtain G light rays as 0th-order diffracted light, R light rays as first-order diffracted light, and B light rays as -first-order diffracted light, angles the ±first-order diffracted light components make with the 0th-order diffracted light do not match each other independently of the pitch setups of the linear blazed diffraction grating, and some asymmetry remains unremoved. For this reason, the color light beams have different spacings on the surface of the 3-line sensor 89.

Hence, conventionally, a special sensor which has asymmetric line spacings in the sub-scanning direction, i.e., does not have normal equal line spacings is used as a 3-line sensor, or an optical element for correcting the spacings of the color light beams color-separated by the linear blazed diffraction grating to be equal to each other on the 3-line sensor must be inserted into the optical path between the linear blazed diffraction grating and 3-line sensor.

Generally speaking, the spacings $S_1$, and $S_2$ between the adjacent lines of the 3-line sensor preferably assume equal values in terms of an easy semiconductor process.

Other problems of the conventional color image reading apparatus having the aforementioned color-separation optical system will be explained below with the aid of FIG. 5. Note that the same reference numerals in FIG. 5 denote the same parts as those in FIG. 3.

Figure 5:
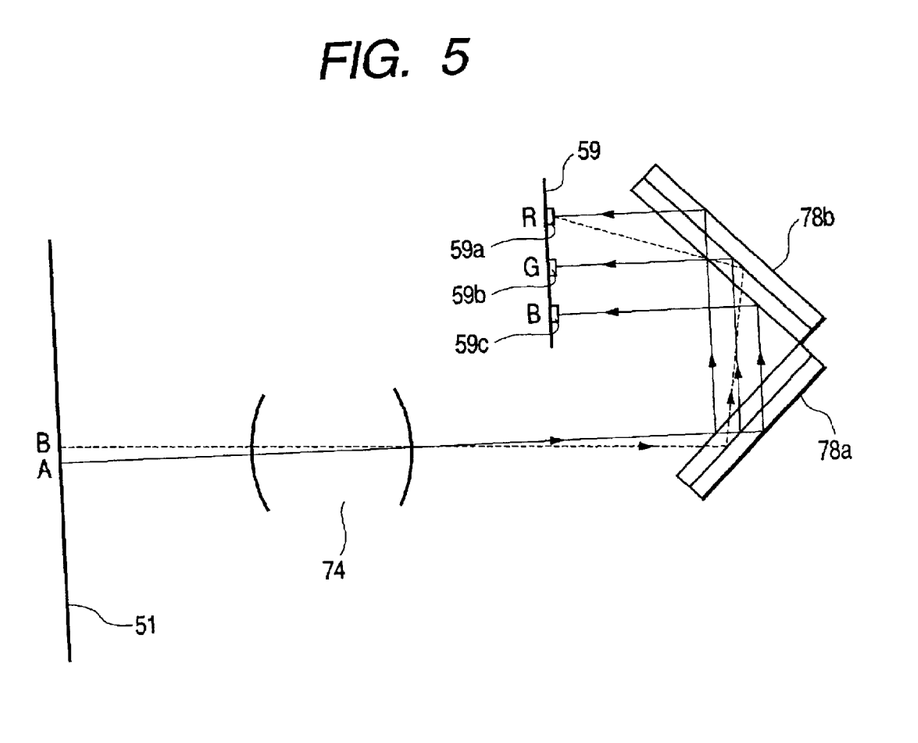
FIG. 5 is a schematic view showing principal part of the optical system of a conventional color image reading apparatus.

Referring to FIG. 5, when color image information at a point A on the original surface 51 is color-separated into three color light beams using the two beam splitters 78a and 78b for color separation, and these color light beams are focused on the surfaces of the corresponding line sensors 59a, 59b, and 59c, color image information from a point B, which is in the neighborhood of the point A, e.g., a light beam having G (green) image information is reflected by the beam splitters 78a and 78b at the same time, and is focused on the R line sensor 59a which does not correspond to that G (green) image information. Such problem is generally called crosstalk of color information in the sub-scanning direction, and upon reading color image information, such crosstalk is one of causes that produce image disturbance.

The crosstalk in the sub-scanning direction occurs not only in the color image reading apparatus using the beam splitters for color separation, as shown in FIG. 5, but also similarly in a color image reading apparatus using the linear blazed diffraction grating as the color-separation means, as shown in FIG. 4.

Conventionally, in order to prevent crosstalk of color information in the sub-scanning direction, i.e., to intercept a light beam coming from the point B in the vicinity of the point A on the original surface 51, a small slit 56 is placed in the vicinity of the surface of the original 51.

However, the small slit 56 which has the same main scanning length as that of the original surface 51, and has a very small sub-scanning width must be accurately attached in the vicinity of the original surface 51, and at the same time, synchronization errors must be accurately suppressed so as to prevent a light beam from being eclipsed by the slit. Such structure is mechanically very difficult to obtain.

SUMMARY OF THE INVENTION

It is an object of the present invention to provide a color image reading apparatus which, upon color-separating a color image into a plurality of color light beams using a linear blazed diffraction grating as a color-separation means and reading the color image using a monolithic 3-line sensor as a light-receiving means, can increase the latitude of a slit that prevents crosstalk of color information in the sub-scanning direction by temporarily forming the color image by a first cylinder means at a predetermined magnification in only the sub-scanning direction within the optical path before an imaging means, whereby required mechanical precision can be relaxed by broadening the allowable range of synchronization errors caused due to the attachment precision of a scanning mirror, parallelness between the original surface and a guide rail that guides a scanning mirror unit.

It is another object of the present invention to provide a color image reading apparatus which corrects different imaging positions resulting from different wavelengths of color light beams color-separated by the linear blazed diffraction grating using different refractive indices depending on different wavelengths (colors) by a line spacing correction means so as to set equal spacings between adjacent color light beams color-separated in the sub-scanning direction on the surface of the light-receiving means, thereby digitally accurately reading a color image using three, i.e., R, G, and B color light beams.

According to the present invention, a color image reading apparatus, which forms a color image on the surface of light-receiving means obtained by setting a plurality of line sensors on a single substrate via imaging means, and reads the color image by the light-receiving means by scanning the color image and the light-receiving means relative to each other, is characterized by comprising: first cylinder means, inserted in an optical path between the color image and imaging means, for temporarily forming the color image in the sub-scanning direction in the optical path before the imaging means; and color-separation means, inserted in an optical path between the imaging means and light-receiving means, for color-separating an incoming light beam into a plurality of color light beams. The apparatus is also characterized by further comprising line spacing correction means for correcting deviations of imaging positions on the surface of the light-receiving means produced due to different wavelengths of the color light beams color-separated by the color-separation means, and second cylinder means having a power in the sub-scanning direction.

Especially, the apparatus is characterized in that:

the color-separation means, the line spacing correction means, and the second cylinder means inserted in the optical path between the imaging means and the light-receiving means are placed in an order of the color-separation means, the line spacing correction means, and the second cylinder means from the side of the imaging means;

the color-separation means, the line spacing correction means, and the second cylinder means inserted in the optical path between the imaging means and the light-receiving means are placed in an order of the second cylinder means, the color-separation means, and the line spacing correction means from the side of the imaging means;

the line spacing correction means comprises a plane-parallel glass, the color-separation means comprises a transmission linear blazed diffraction grating, and the plane-parallel glass and the transmission linear blazed diffraction grating are integrated and are placed to have a tilt with respect to an optical axis of the imaging means;

the line spacing correction means sets spacings between adjacent ones of the plurality of color light beams color-separated in the sub-scanning direction on the surface of the light-receiving means to be equal to each other by changing optical paths of the color light beams using different refractive indices depending on different wavelengths;

a slit is placed at or near a position where the first cylinder means temporarily images;

the first cylinder means comprises a cylindrical lens having a power in the sub-scanning direction;

the second cylinder means comprises a first cylindrical lens having a negative power in the sub-scanning direction, and a second cylindrical lens having a positive power in the sub-scanning direction;

the color-separation means color-separates an incoming light beam into three color light beams in a direction perpendicular to a line-up direction of pixels of the line sensors; and so forth.

Also, according to the present invention, a color image reading apparatus, which focuses a light beam bearing color image information on the original surface illuminated with illumination means on the surface of reading means by imaging means via first and second mirrors and color-separation means that color-separates an incoming light beam into a plurality of color light beams, and reads the color image information by the reading means, is characterized in that at least two cylindrical lenses are inserted in an optical path between the original surface and imaging means, and a stop is placed at or near a position where the color image on the original surface is temporarily formed by the cylindrical lens placed on the original surface side.

Especially, the apparatus is characterized in that:

the cylindrical lens placed on the original surface side has a positive refractive power, and is disposed in the vicinity of the original surface;

the cylindrical lens placed on the original surface side has a positive refractive power, and is inserted between the first and second mirrors;

the stop and second mirror are integrated;

the cylindrical lens placed on the side of the imaging means has a positive refractive power, and is placed in the vicinity of the imaging means;

the second and third mirrors construct an inverted-V-shaped mirror unit;

the color-separation means comprises a transmission or reflection diffraction grating;

the color-separation means comprises a dichroic prism or dichroic mirror; and so forth.

DETAILED DESCRIPTION OF THE PREFERRED EMBODIMENTS

Figure 6:
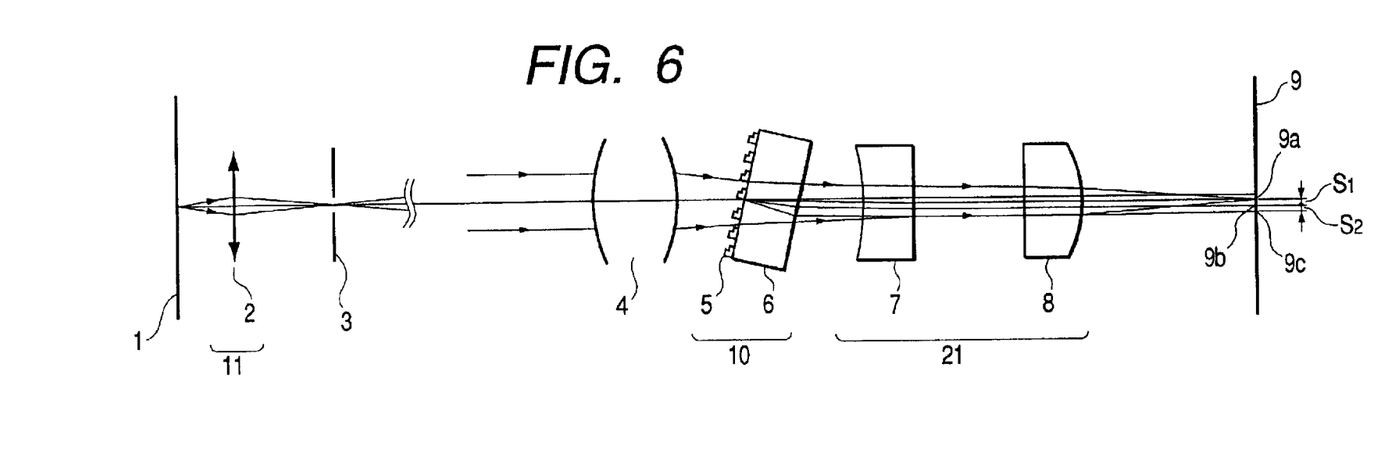
FIG. 6 is a schematic view showing principal part of the first embodiment of a color image reading apparatus according to the present invention in the sub-scanning direction.

FIG. 6 is a schematic view showing principal part of the first embodiment of a color image reading apparatus according to the present invention in the sub-scanning direction.

Referring to FIG. 6, a color image is formed on an original surface 1 which serves as an object.

A first cylinder unit 11 has a first cylindrical lens 2 having a positive power in the sub-scanning direction, and temporarily forms a color image at a predetermined magnification in only the sub-scanning direction in the optical path before an imaging means (to be described later).

A slit (stop) 3 is elongated in the main scanning direction perpendicular to the plane of paper of FIG. 6, and prevents crosstalk of color information in the sub-scanning direction perpendicular to the main scanning direction. The slit 3 is placed on or near the image plane of the first cylindrical lens 2.

In this embodiment, since the first cylindrical lens 2 temporarily forms a color image at a predetermined magnification in only the sub-scanning direction in the optical path before the imaging means (the imaging magnification at that time will be referred to as a "temporal imaging magnification" hereinafter), the latitude of the slit 3 is increased.

An imaging lens 4 serves as the imaging means, and images a light beam based on a color image on the surface of a light-receiving means via an optical member 10 and second cylinder unit 21 (to be described later).

The optical member 10 is formed by integrating a transmission linear blazed diffraction grating (to be also referred to as a "diffraction grating" hereinafter) 5 serving as a color-separation means, and a plane-parallel glass 6 serving as a line spacing correction means, and is placed to have a given tilt with the optical axis of the imaging lens 4.

The transmission diffraction grating 5 separates an incoming light beam into predetermined color light beams, e.g., three R (red), G (green), and B (blue) primary color light beams, and transmits and diffracts them, thus imaging these light beams on the surface of a monolithic 3-line sensor as a light-receiving means (to be described later) as light beams of convergent spherical waves by the imaging lens.

The plane-parallel glass 6 serving as the line spacing correction means comprises, e.g., an S-TIH11 material (tradename; available from OHARA Corp). The plane-parallel glass 6 corrects any deviations of imaging positions (focusing positions) in the sub-scanning direction, which are produced due to different wavelengths of diffracted light components, by shifting the optical paths of the individual color light beams using different refractive indices depending on different wavelengths (colors), so that spacings $S_1$, and $S_2$ between neighboring color light beams color-separated in the sub-scanning direction on the surface of the monolithic 3-line sensor (to be described later) are equal to each other.

The second cylinder unit 21 has a second-first cylindrical lens 7 having a negative power in the sub-scanning direction, and a second-second cylindrical lens 8 having a positive power in the sub-scanning direction.

In this embodiment, the optical member 10 that integrates the diffraction grating 5 and plane-parallel glass 6, and the second cylinder unit 21 having a second-first cylindrical lens 7 and second-second cylindrical lens 8 are placed in turn from the side of the imaging lens 4, and the optical member 10 is placed to make a given tilt angle with the optical axis of the imaging lens 4.

A light-receiving means 9 comprises a so-called monolithic 3-line sensor (to be also referred to as a "3-line sensor" hereinafter) formed by setting three line sensors (CCDS) 9a, 9b, and 9c on a single substrate to be parallel to each other. For example, one pixel has a size of 8 $\mu$m×8 $\mu$m, and the neighboring line sensors have a spacing for 8 lines in the sub-scanning direction.

In this embodiment, a color image on the original surface 1 is scanned in units of lines by a scanning means (scanning mirror unit) comprising a scanning mirror and the like (not shown), and a light beam (information light) reflected by the color image illuminated with an illumination light source (not shown) is temporarily formed at a predetermined magnification in only the sub-scanning direction by the first cylindrical lens 2. The light beam based on the temporarily formed color image is focused by the imaging lens 4, and is color-separated into three color light beams (e.g., R, G, and B) via the optical member 10 that integrates the diffraction grating 5 and plane-parallel glass 6. After that, the respective color images are respectively formed on the surfaces of the corresponding line sensors 9a, 9b, and 9c via the second-first cylindrical lens 7 and second-second cylindrical lens 8.

At this time, in this embodiment, since diffracted light beams of the respective orders color-separated by the diffraction grating are transmitted through the plane-parallel glass 6, the spacings $S_1$, and $S_2$ between neighboring ones of the three color light beams color-separated in the sub-scanning direction on the surface of the 3-line sensor 9 are corrected to be equal to each other. Then, the color image based on the color light beams is digitally read by the 3-line sensor 9.

Normally, when a light beam is color-separated into three, i.e., R, G, and B color light beams by a linear blazed diffraction grating alone using 0th-and ±first-order diffracted light components, angles the ±first-order diffracted light components make with the 0th-order diffracted light do not agree with each other independently of the pitch setups of the linear blazed diffraction grating, and some asymmetry remains unremoved. For this reason, the color light beams have different spacings (color light spacings) on the surface of the 3-line sensor.

To prevent such problem, in this embodiment, since the diffracted light components of the respective orders color-separated by the diffraction grating. 5 are transmitted through the plane-parallel glass 6, as described above, the spacings $S_1$, and $S_2$ between the neighboring ones of the three color light beams color-separated in the sub-scanning direction on the surface of the 3-line sensor 9 are corrected to be equal to each other.

Figure 7:
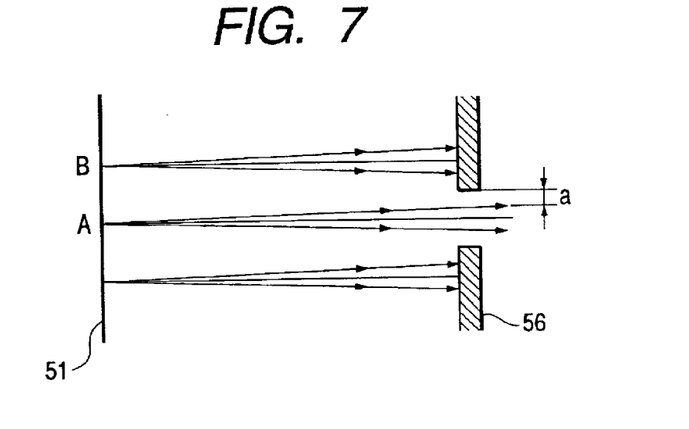
FIG. 7 is a schematic view showing principal part around a slit of a conventional color image reading apparatus which does not use temporal imaging.
Figure 8:
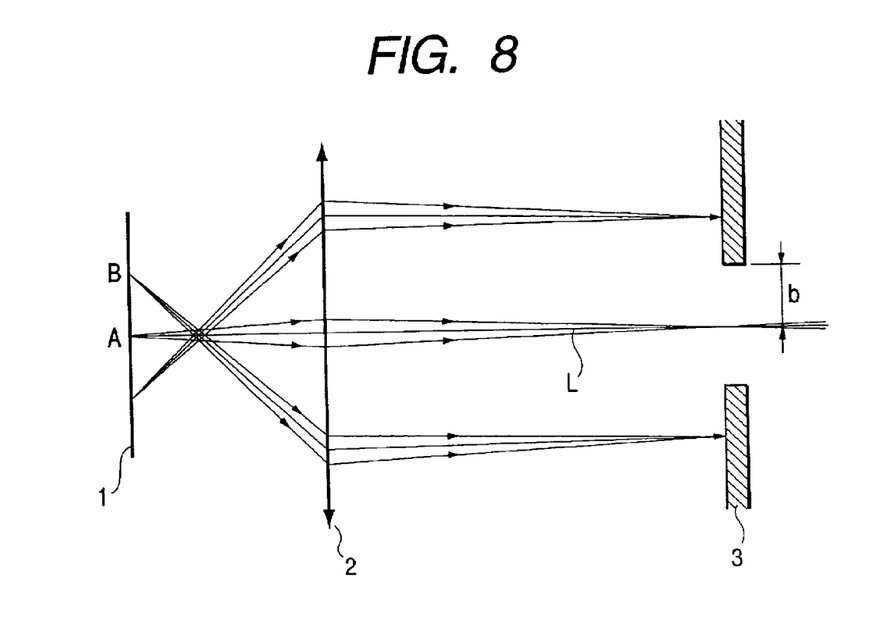
FIG. 8 is a schematic view showing principal part around a slit of the first embodiment of the present invention.

Means for preventing crosstalk of color information in the sub-scanning direction according to the present invention will be explained below with reference to FIGS. 7 and 8. FIG. 7 is a schematic view showing principal part around a conventional slit shown in FIG. 3, and FIG. 8 is a schematic view showing principal part around the slit 3 of the embodiment shown in FIG. 6. The same reference numerals in FIGS. 7 and 8 denote the same parts as those in FIGS. 3 and 6.

Referring to FIG. 7, a slit 56 is placed in the vicinity of an original surface 51 to intercept a light beam coming from a point B near a point A of a read image on the original surface 51. In this case, a light beam has a finite width at the position of the slit 56, and the allowable range of synchronization errors arising from the attachment precision of a scanning mirror (not shown), the parallelness between the original surface and a guide rail that guides a scanning mirror unit, and the like has a width a shown in FIG. 7.

FIG. 8 shows a state wherein a color image is temporarily formed at a magnification larger than equal magnification in the sub-scanning direction by the first cylindrical lens 2 having a positive power in the sub-scanning direction. In this case, the light beam does not have any finite width at the position of the slit 3. For example, if n represents the temporal imaging magnification, and b represents the spacing between the slit 3 and optical axis L, b>(n·a) holds. Since this can broaden the allowable range of synchronization errors, the attachment precision of a scanning mirror (not shown), the parallelness between the original surface and a guide rail that guides a scanning mirror unit, and the like can be greatly relaxed as compared to the prior art shown in FIG. 7.

If the temporal imaging magnification n is set at, e.g., about 2×, a cylindrical lens having a negative power and a cylindrical lens having a positive power are required to match the imaging magnifications in the main scanning and sub-scanning directions with each other. As for their layout, independently of the positions of the cylindrical lenses, i.e., before or after the imaging lens, these lenses must be placed in the order of the surface having a negative power and the surface having a positive power. In this case, the layout of the cylindrical lenses with respect to the plane-parallel glass for line spacing correction must be carefully determined. For example, since the cylindrical lens having a strong, positive power serves to weaken the line spacing correction effect, if the cylindrical lens having a positive power alone is placed after the plane-parallel glass, the line spacings cannot be satisfactorily corrected.

In this embodiment, since the plane-parallel glass 6 is inserted in the optical path between the second-first cylindrical lens 7 having a negative power in the sub-scanning direction and the second-second cylindrical lens 8 having a positive power in the sub-scanning direction, as described above, the line spacings are satisfactorily corrected.

In this embodiment, the first and second cylindrical lenses 7 and 8 that construct the second cylinder unit 21 are independently prepared, but they may be integrated.

In this embodiment, the diffraction grating 5 and plane-parallel glass 6 are integrally formed, but may be formed independently. In such case, the plane-parallel glass 6 can be placed to make a predetermined tilt angle with the optical axis of the imaging lens 4.

In this embodiment, the transmission linear blazed diffraction grating is used as the color-separation means. Alternatively, a reflection linear blazed diffraction grating may be used.

Figure 9:
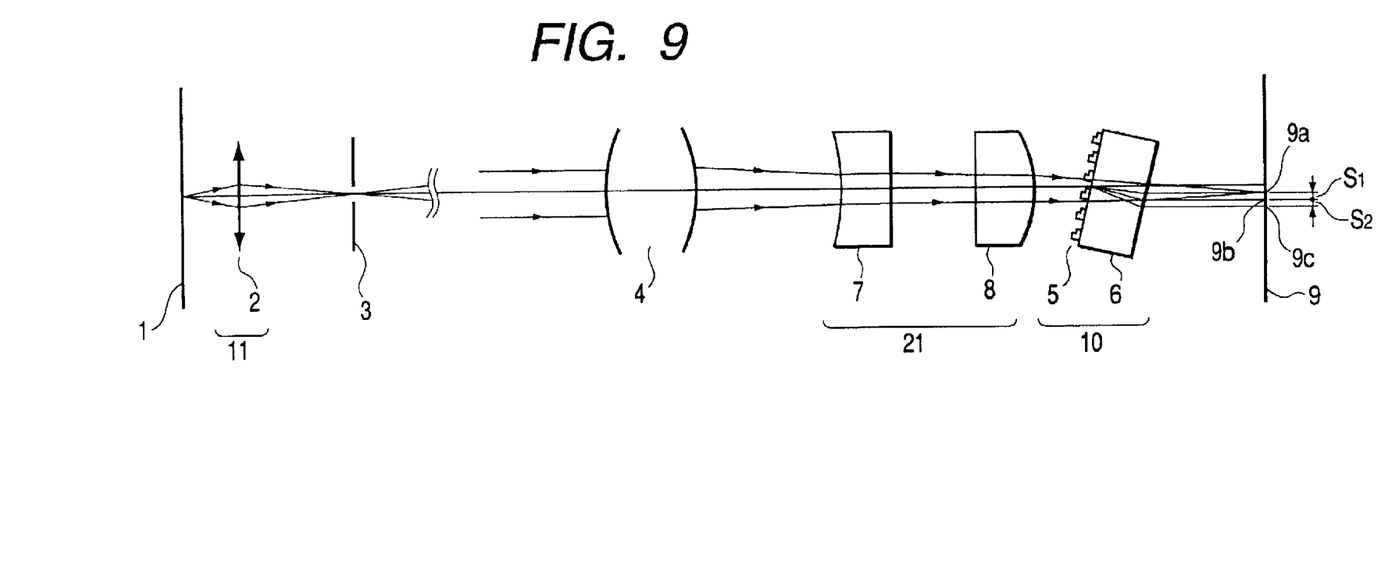
FIG. 9 is a schematic view showing principal part of the second embodiment of a color image reading apparatus according to the present invention in the sub-scanning direction.

FIG. 9 is a schematic view showing principal part of the second embodiment of a color image reading apparatus according to the present invention in the sub-scanning direction. The same reference numerals in FIG. 9 denote the same parts as those in FIG. 6.

This embodiment is different from the first embodiment described above in that the optical member 10 that integrates the transmission diffraction grating and plane-parallel glass is inserted in the optical path between the second cylinder unit 21 and light-receiving means 9. Other arrangements and optical effects are substantially the same as those in the first embodiment, thus obtaining the same effects.

More specifically, in this embodiment, the second cylinder unit 21 having the second-first cylindrical lens 7 and second-second cylindrical lens 8, and the optical member 10 that integrates the transmission linear blazed diffraction grating 5 serving as the color-separation means and the plane-parallel glass 6 serving as the line spacing correction means are placed in turn from the side of the imaging lens 4, and the optical member 10 is placed to make a predetermined tilt angle with the optical axis of the imaging lens 4.

In this embodiment, since the optical member 10 is inserted in the optical path between the second cylinder unit 21 and light-receiving means 9, there is no optical element that weakens the correction effect after the line spacings are corrected and, hence, the line spacings can be corrected more satisfactorily.

To restate, in this embodiment, since the first cylindrical lens 2 that temporarily forms a color image at a predetermined magnification in only the sub-scanning direction in the optical path before the imaging lens 4 is inserted in the optical path between the original surface 1 and imaging lens 4, and the optical member 10 that integrates the transmission diffraction grating 5 and plane-parallel glass 6 is placed to make a predetermined tilt angle with the optical axis of the imaging lens 4, the latitude of the slit 3 for preventing crosstalk of color information in the sub-scanning direction can be increased, thereby broadening the allowable range of synchronization errors resulting from the attachment precision of a scanning mirror (not shown), the parallelness between the original surface and a guide rail that guides a scanning mirror unit, and the like. In this way, required mechanical precision can be relaxed, and color image information can be accurately read by the 3-line sensor 9 with a simple arrangement without requiring any accurate adjustment.

In the first and second embodiments, the second cylinder unit is inserted in the optical path behind the imaging lens. However, the present invention is not limited to such specific layout. For example, when the second cylinder unit is inserted in the optical path before the imaging lens, the present invention can be similarly applied as in the above embodiments.

In the first and second embodiments, the tilt angle θ the optical member makes with the optical axis is preferably set to fall within the range between 1° and 40°. Also, the thickness d of the plane-parallel glass 6 is preferably set to fall within the range between 1 mm and 25 mm.

According to the present invention, upon color-separating a color image into a plurality of color light beams using the linear blazed diffraction grating serving as the color-separation means and reading the color image using the monolithic 3-line sensor serving as the light-receiving means, since the first cylinder unit inserted in the optical path between the color image and imaging means temporarily forms the color image at a magnification equal to or larger than equal magnification in the sub-scanning direction in the optical path before the imaging means, the latitude of the slit that prevents crosstalk of color information in the sub-scanning direction can be increased to broaden the allowable range of synchronization errors caused due to the attachment precision of a scanning mirror, parallelness between the original surface and a guide rail that guides a scanning mirror unit, and the like, thereby relaxing required mechanical precision, and since the line spacing correction means inserted in the optical path between the imaging means and light-receiving means corrects any deviations of imaging positions due to different wavelengths of color light beams (diffracted light components) color-separated by the linear blazed diffraction grating using different refractive indices depending on different wavelengths (colors), the spacings of a plurality of color light beams color-separated in the sub-scanning direction on the surface of the light-receiving means can be set to be equal to each other, thus achieving a color image reading apparatus which can digitally and accurately read a color image using three, e.g., R, G, and B, color light beams.

Other embodiments of the present invention will be explained hereinafter.

Figure 10:
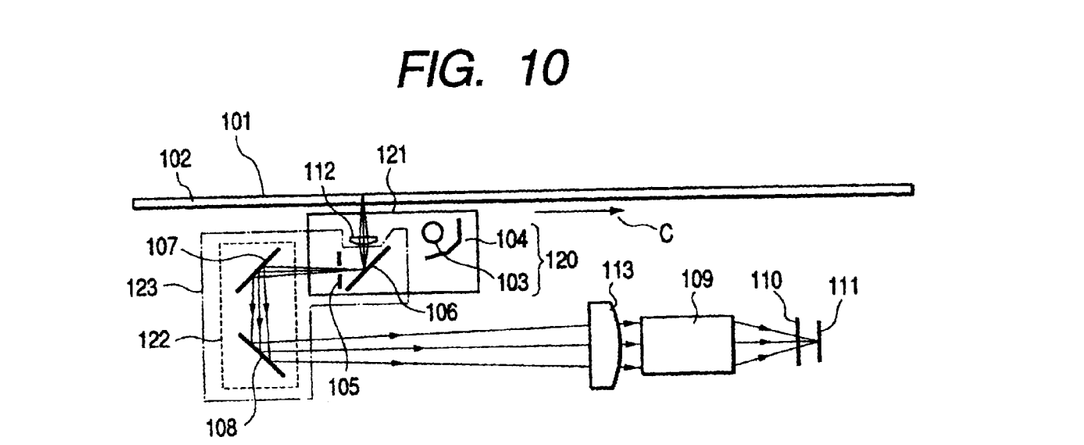
FIG. 10 is a schematic view showing principal part of the optical system of the third embodiment when the present invention is applied to a color image reading apparatus.

FIG. 10 is a schematic view showing principal part of the third embodiment of the present invention in the sub-scanning direction. In this embodiment, a reading optical system is applied to a color image reading apparatus as an image reading apparatus.

Referring to FIG. 10, color image information is normally formed on an original surface 101 which serves as an object, and is placed on a platen glass 102. An illumination means 120 is constructed by a light source 103 comprising, e.g., a halogen lamp, fluorescent lamp, or the like, and a reflector 104.

A first cylindrical lens 112 has a positive (convex) refractive power in the sub-scanning direction, and is inserted in the optical path between the original surface 101 and a first mirror 106 at a position in the vicinity of the original surface 101. The first cylindrical lens 112 is set so that the original surface is substantially optically conjugate with a stop 105 (to be described later).

A scanning mirror unit 123 is composed of three reflection mirrors, i.e., first, second, and third mirrors 106, 107, and 108 in the order from the original surface 101 side. Especially, the second and third mirrors 107 and 108 construct a right-angle, inverted-V shaped mirror unit (the extended lines of the reflection surfaces of the second and third mirrors 107 and 108 make a right angle) 112 which serves as a second scanning unit, and guide a light beam bearing color image information and reflected by the original surface 101 to an imaging lens 109 as an imaging means (to be described later). The scanning mirror unit 123 in this embodiment scans the original surface 101 in the sub-scanning direction together with the illumination means 120 and the like along a guide rail (not shown), and a reading means (to be described later) sequentially reads color image information at timings in synchronism with scanning positions.

The stop (slit) 105 is placed at or near a position where the first cylindrical lens 112 temporarily forms a color image (image information) on the original surface 101, and has an aperture elongated in a direction perpendicular to the plane of the paper (main scanning direction) as the line-up direction of pixels on a line sensor (to be described later). The slit 105 prevents an off-axis light beam from being color-separated by a transmission diffraction grating 110 serving as a color-separation means (to be described later) and predetermined color information from becoming incident on a location other than a predetermined line sensor, thus suppressing crosstalk of color information.

Note that the illumination means 120, first cylindrical lens 112, first mirror 106, and stop 105 make up a first scanning unit 121.

A second cylindrical lens 113 has a positive (convex) refractive power in the scanning direction, and is inserted in the optical path between the third mirror 108 and the imaging lens 109 (to be described later) at a position in the vicinity of the imaging lens 109. The second cylindrical lens 113 in this embodiment corrects various aberrations, changes in magnification, and the like produced due to insertion of the first cylindrical lens 112.

The imaging lens 109 serves as an imaging means, and images a light beam bearing color image information on the original surface 101 on the surface of a reading means 111 via the color-separation means 110.

The transmission diffraction grating 110 serves as the color-separation means, and color-separates a light beam bearing color image information coming from the imaging lens 109 into three, e.g., R (red), G (green), and B (blue) color light beams.

The reading means 111 comprises a so-called monolithic 3-line sensor (to be also referred to as a "3-line sensor" hereinafter) formed by setting three line sensors (CCDS) on a single substrate to be parallel to the main scanning direction.

In this embodiment, a light beam bearing color image information on the original surface 101 illuminated with the illumination means 120 is temporarily formed at or near the position of the stop 105 by the first cylindrical lens 112 via the first mirror 106. The light beam that has passed through the aperture of the stop 105 is focused by the second cylindrical lens 113 and imaging lens 109 via the second and third mirrors 107 and 108, and is color-separated into three color light beams (R, G, and B) via the diffraction grating 110. These color light beams are imaged on the corresponding line sensor surfaces, and the color image information on the original surface 101, is digitally read by the 3-ine sensor 111.

The first scanning unit 121 is moved at a velocity V along the original surface 101 in the sub-scanning direction, as indicated by an arrow C, and the right-angle, inverted-V shaped mirror unit 122 serving as the second scanning unit is moved at a velocity V/2 along the original surface 101 in the sub-scanning direction, as indicated by the arrow C in synchronism with the first scanning unit 121, thereby two-dimensionally reading color image information on the original surface 101.

In FIG. 10, the original surface 101 may be moved in the sub-scanning direction in place of the first and second scanning units 121 and 122, or the first and second scanning units 121 and 122 and the original surface 101 may be moved relative to each other.

Figure 11:
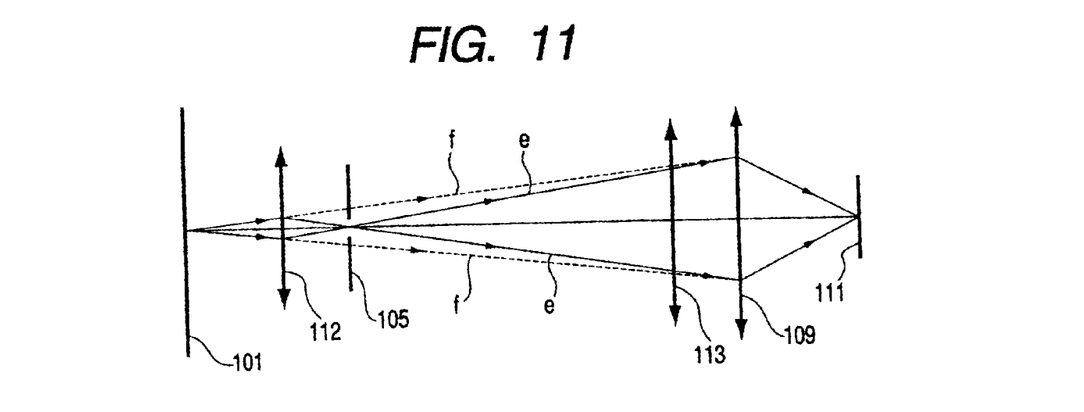
FIG. 11 is a schematic view showing principal part of the paraxial layout of lenses in FIG. 10.

FIG. 11 is a schematic view (refractive power layout chart) showing principal part in the sub-scanning direction, i.e., paraxially optically expressing the optical system of the color image reading apparatus shown in FIG. 10. Referring to FIG. 11, arrows indicate the principal plane positions of the respective lenses, solid line e indicates an optical path when the first and second cylindrical lenses 112 and 113 according to this embodiment are inserted in the optical path and the stop 105 is placed at the imaging position of the first cylindrical lens 112, and dotted line f indicates the optical path of a comparative example (see FIG. 12) when neither of the first and second cylindrical lenses 112 and 113 are inserted in the optical path.

Figure 12:
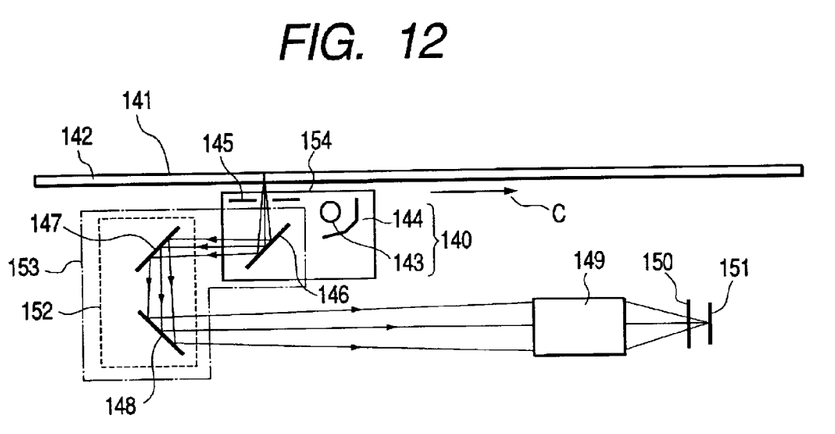
FIG. 12 is a schematic view showing principal part of the optical system of a comparative color image reading apparatus.

FIG. 12 is a schematic view showing principal part of a color image reading apparatus without any cylindrical lenses, in the sub-scanning direction.

Referring to FIG. 12, a color image is normally formed on an original surface 141. The original is placed on a platen glass 142. An illumination means 140 comprises a light source 143, reflector 144, and the like. A stop (slit) 145 is placed in the vicinity of the original surface 141, and prevents an off-axis light beam from being color-separated by a transmission diffraction grating 150 serving as a color-separation means (to be described later) and predetermined color information (R, G, and B color light beams) from becoming incident on a location other than a predetermined line sensor, thus suppressing crosstalk of color information.

A scanning mirror unit 153 is constructed by three reflection mirrors, i.e., first, second, and third mirrors 146, 147, and 148. Especially, the second and third mirrors 147 and 148 build a right-angle, inverted-V shaped mirror unit (the extended lines of the reflection surfaces of the second and third mirrors 147 and 148 make a right angle) 152 which serves as a second scanning unit. The scanning mirror unit 153 scans the original surface 141 in the sub-scanning direction together with the illumination means 120 and the like along a guide rail (not shown), and a monolithic 3-line sensor (reading means; to be described later) 151 sequentially reads color image information at timings in synchronism with scanning positions.

Note that the illumination means 140, stop 145, and first mirror 146 construct the first scanning unit 154.

An imaging lens 149 serves as an imaging means, and forms an image based on color image information on the original surface 141 on the surface of the monolithic 3-line sensor 151.

A color-separation means 150 comprises a transmission diffraction grating, and color-separates a light beam bearing color image information into three, e.g., R (red), G (green), and B (blue) color light beams.

The reading means 151 comprises a so-called monolithic 3-line sensor (to be also referred to as a "3-line sensor" hereinafter) formed by setting three line sensors (CCDs) on a single substrate to be parallel to the main scanning direction.

Referring to FIG. 12, of the light components scattered and reflected by color image information on the original surface 141 illuminated with the illumination means 140, a light beam that has passed through the aperture of the slit 145 is focused by the imaging lens 149 via the first, second, and third mirrors 146, 147, and 148, and is color-separated into three color light beams (R, G, and B) via the diffraction grating 150. After that, these color light beams are imaged on the corresponding line sensor surfaces, and the 3-line sensor 151 digitally reads color image information on the original surface 141.

The first scanning unit 154 is moved at a velocity V along the original surface 141 in the sub-scanning direction, as indicated by an arrow C, and the right-angle, inverted-V shaped mirror unit 152 serving as the second scanning unit is moved at a velocity V/2 along the original surface 141 in the sub-scanning direction, as indicated by the arrow C in synchronism with the first scanning unit 154, thereby two-dimensionally reading color image information on the original surface 141.

In FIG. 12, the original surface 141 may be moved in the sub-scanning direction in place of the first and second scanning units 154 and 152, or the first and second scanning units 154 and 152 and the original surface 141 may be moved relative to each other.

When the first cylindrical lens 112 having a positive power is inserted in the optical path near the original surface 101 and the second cylindrical lens 113 having a positive power is inserted in the optical path near the imaging lens 109, as shown in FIG. 11, a re-imaging optical system (reading optical system) can be built while maintaining compatibility between the optical path from the original surface 101 to the principal plane of the first cylindrical surface 112 and the optical path from the principal plane of the imaging lens 109 to the 3-line sensor 111, and the reading optical system shown in FIG. 12, i.e., maintaining the total optical path length, optical magnification, f-number, and the like.

More specifically, in FIG. 11, when the total optical system length is set at 573.62 mm, the spacing between the original surface 101 and first cylindrical lens 112 is set at 28 mm, the spacing between the original surface 101 and position of the stop 105 is set at 53 mm, the focal length of the first cylindrical lens 112 is set at 12.54 mm, the spacing between the principal planes of the second cylindrical lens 113 and imaging lens 109 is set at 10 mm, the focal length of the second cylindrical lens 113 is set at 4,290 mm, and the focal length of the imaging lens 109 is set at 82.485 mm, the re-imaging optical system can be constructed.

In this embodiment, as described above, since the first and second cylindrical lenses 112 and 113 are inserted in the optical path between the original surface 101 and imaging lens 109 to distribute the refractive power, and the stop 105 is placed at or near a position where the first cylindrical lens 112 temporarily forms a color image, even when the right-angle detection (angle precision) of the inverted-V shaped mirror unit 112 of the scanning mirror unit 123 suffer errors, chief light rays always pass through nearly the center of the stop 105, i.e., a light beam which has passed through the stop 105 rarely changes its position. Hence, the aperture width of the stop 105 can be sufficiently reduced, and crosstalk of off-axis light (color information) upon color separation by the diffraction grating 110 can be suppressed.

Conversely, if the aperture width of the stop 105 remains the same, the allowable range of right-angle detection errors of the inverted-V-shaped mirror unit 122 can be broadened. As a result, right-angle detection of the inverted-V-shaped mirror unit 122 can be easily adjusted, and the adjustment time required in the manufacturing process can be shortened. Also, assembly efficiency can be improved.

In this embodiment, a diffraction grating is used as the color-separation means. However, the present invention is not limited to such specific element. For example, the present invention can be similarly applied as in the third embodiment even when the color-separation means uses other optical members capable of color-separating a color image into a plurality of color light beams, e.g., a dichroic prism, dichroic mirror, and the like. The diffraction grating is not limited to transmission type but may be reflection type.

Figure 13:
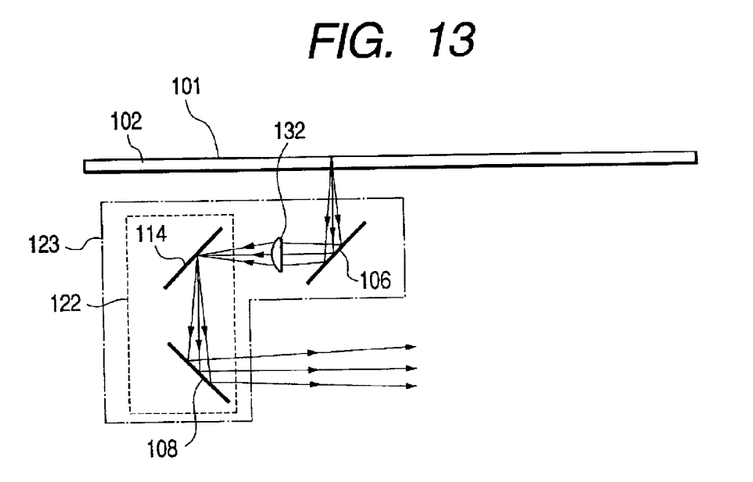
FIG. 13 is a partial schematic view showing principal part of the optical system of the fourth embodiment when the present invention is applied to a color image reading apparatus.

FIG. 13 is a partial schematic view showing principal part of an optical system of the fourth embodiment in the sub-scanning direction when the present invention is applied to a color image reading apparatus.

This embodiment is different from the aforementioned third embodiment in that a first cylindrical lens is inserted in the optical path between first and second mirrors, and an optical member that integrates the second mirror and a stop is placed at or near a position where the first cylindrical lens temporarily forms a color image. Other arrangements and optical effects are the same as those in the third embodiment described above, thus obtaining the same effects.

More specifically, a first cylindrical lens 132 has a positive refractive power in the scanning direction, and is inserted in the optical path between the first mirror 106 and an optical member 114 (to be described below). The optical member 114 integrates the second mirror and a stop (to be also referred to as a "mirror/stop unit" hereinafter), and has both an optical effect of a reflection mirror and that of a stop. The optical member 114 is placed at or near a position where the first cylindrical lens 132 temporarily forms a color image on the original surface 101.

In this embodiment, since the second mirror and stop are integrated, the number of parts can be reduced, and the entire apparatus can be made compact. In this embodiment, since the mirror/stop unit 114 is placed at or near a position where the first cylindrical lens 132 temporarily forms a color image, the mirror/stop unit 114 is substantially optically conjugate with the original surface 101. With this layout, even when the position of the mirror has varied, the chief light ray position of the original surface 101 rarely changes, thus providing a structure which is strong against dynamic environmental variations over time.

According to the present invention, a reading optical system and an image reading apparatus using the same, which can obtain the following effects, can be achieved.

(1) Since the first and second cylindrical lenses are inserted in the optical path between the original surface and imaging lens, and the stop is placed at or near a position where the first cylindrical lens placed on the original surface side temporarily forms a color image (image information), the light beam that has passed through the stop does not change independently of the right-angle detection errors of the inverted-V-shaped mirror unit, thus reducing the aperture width of the stop, and suppressing crosstalk of off-axis light upon color-separation by the color-separation means.

If the aperture width of the stop remains the same, the allowable range of right-angle detection errors of the inverted-V-shaped mirror unit can be broadened. As a result, right-angle detection of the inverted-V-shaped mirror unit can be easily adjusted, and the adjustment time required in the manufacturing process can be shortened. Also, assembly efficiency can be improved.

(2) Since the optical member (mirror/stop unit) that integrates the stop and second mirror is placed at the position where the first cylindrical lens temporarily forms a color image, the number of parts can be reduced.

Since the chief light ray position of the original surface rarely changes even upon displacement of the mirror, a structure which is strong against dynamic environmental variations over time can be provided.

(3) When the reading optical system is applied to a color image reading apparatus as an image reading apparatus, the quality of the read color image can be improved.

What is claimed is:

1. A color image reading apparatus comprising:

light-receiving means formed by a plurality of line sensors;

imaging means for providing a light beam from an object to said light-receiving means;

color-separation means, inserted in a first optical path between said imaging means and said light-receiving means, for color-separating the light beam into a plurality of color light beams;

first optical means having a power in a sub-scanning direction, inserted in a second optical path between the object and said imaging means, for temporarily imaging the light beam from the object in the sub-scanning direction in the second optical path; and a slit disposed between said first optical means and said imaging means in the second optical path, at a position where said first optical means temporarily images the light beam from the object in the sub-scanning direction.

2. An apparatus according to claim 1, further comprising:

line spacing correction means for correcting deviations of imaging positions on a surface of said light-receiving means caused by different wavelengths of the color light beams color-separated by said color-separation means; and second optical means having a power in the sub-scanning direction.

3. An apparatus according to claim 2, wherein said color-separation means, said line spacing correction means, and said second optical means are inserted in the optical path between said imaging means and said light-receiving means and are placed in an order of said color-separation means, said line spacing correction means, and said second optical means from the side of said imaging means.

4. An apparatus according to claim 2, wherein said color-separation means, said line spacing correction means, and said second optical means are inserted in the optical path between said imaging means and said light-receiving means and are placed in an order of said second optical means, said color-separation means, and said line spacing correction means from the side of said imaging means.

5. An apparatus according to claim 2, wherein said line spacing correction means comprises a plane-parallel glass, said color-separation means comprises a transmission linear blazed diffraction grating, and said plane-parallel glass and said transmission linear blazed diffraction grating are integrated and are placed to have a tilt with respect to an optical axis of said imaging means.

6. An apparatus according to claim 2, wherein said line spacing correction means sets spacings between adjacent ones of the plurality of color light beams color-separated in the sub-scanning direction on the surface of said light-receiving means to be equal to each other by changing optical paths of the color light beams using different refractive indices depending on different wavelengths.

7. An apparatus according to claim 2, wherein said first optical means comprises a cylindrical lens.

8. An apparatus according to claim 2, wherein said second optical means comprises a first cylindrical lens having a negative power in the sub-scanning direction, and a second cylindrical lens having a positive power in the sub-scanning direction.

9. An apparatus according to claim 1, wherein said color-separation means color-separates said scanning light beam image into three color light beams in a direction perpendicular to a line-up direction of pixels of said line sensors.

10. An apparatus according to claim 1, further comprising first, second, and third mirrors inserted in the optical path between the object and said imaging means, and wherein said first optical means comprises at least two cylindrical lenses, and said slit is placed at or near a position where the cylindrical lens placed on the object side temporarily images the object.

11. An apparatus according to claim 10, wherein the cylindrical lens placed on the object side has a positive refractive power, and is placed near the object.

12. An apparatus according to claim 10, wherein the cylindrical lens placed on the object side has a positive refractive power, and is inserted between said first and second mirrors.

13. An apparatus according to claim 12, wherein said slit and second mirror are integrated.

14. An apparatus according to claim 10, wherein the cylindrical lens placed on the side of said imaging means has a positive refractive power, and is placed in the vicinity of said imaging means.

15. An apparatus according to claim 10, wherein said second and third mirrors construct an inverted-V-shaped mirror unit.

16. An apparatus according to claim 10, wherein said color-separation means comprises a transmission or reflection diffraction grating.

17. An apparatus according to claim 10, wherein said color-separation means comprises a dichroic prism or dichroic mirror.

18. An apparatus according to claim 1, wherein a slit is placed at or near a position where said first optical means temporarily images the object.

* * * * *

UNITED STATES PATENT AND TRADEMARK OFFICE
CERTIFICATE OF CORRECTION

PATENT NO. : 6,930,807 B1 Page 1 of 1
DATED : August 16, 2005
INVENTOR(S) : Hidekazu Shimomura et al.

It is certified that error appears in the above-identified patent and that said Letters Patent is hereby corrected as shown below:

<u>Column 6,</u>
Line 65, "(CCDS)" should read -- (CCDs) --.

<u>Column 7,</u>
Line 39, "grating." should read -- grating --.

<u>Column 11,</u>
Line 3, "(CCDS)" should read -- (CCDs) --.

Signed and Sealed this

Twenty-fourth Day of January, 2006

JON W. DUDAS
*Director of the United States Patent and Trademark Office*